United States Patent
Von Willich et al.

(10) Patent No.: US 12,301,702 B2
(45) Date of Patent: *May 13, 2025

(54) SYSTEM AND METHOD FOR DISTRIBUTION OF KEY GENERATION DATA IN A SECURE NETWORK

(71) Applicant: QUANTUM BRIDGE TECHNOLOGIES INC., Toronto (CA)

(72) Inventors: Manfred Von Willich, Kanata (CA); Mattia Montagna, Toronto (CA); Hoi-Kwong Lo, Toronto (CA); Paul O'Leary, Kanata (CA)

(73) Assignee: QUANTUM BRIDGE TECHNOLOGIES INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,064

(22) Filed: Apr. 16, 2024

(65) Prior Publication Data

US 2024/0267203 A1    Aug. 8, 2024

Related U.S. Application Data

(63) Continuation of application No. 18/491,415, filed on Oct. 20, 2023, now Pat. No. 11,991,269.

(Continued)

(51) Int. Cl.
*H04L 29/06* (2006.01)
*G06F 21/00* (2013.01)
*H04L 9/08* (2006.01)

(52) U.S. Cl.
CPC .......... *H04L 9/0819* (2013.01); *H04L 9/085* (2013.01)

(58) Field of Classification Search
CPC ..... H04L 9/0819; H04L 9/085; H04L 9/0869; H04L 9/0852
See application file for complete search history.

(56) References Cited

U.S. PATENT DOCUMENTS

| | | | | |
|---|---|---|---|---|
| 5,982,896 A | * | 11/1999 | Cordery | G07B 17/00733 380/45 |
| 8,568,224 B1 | * | 10/2013 | Itkis | G07F 17/3223 463/16 |

(Continued)

FOREIGN PATENT DOCUMENTS

| CA | 3078558 A1 | 4/2019 |
|---|---|---|
| CA | 3107237 C | 1/2022 |

(Continued)

OTHER PUBLICATIONS

Combined Search and Examination Report for UK application No. GB1917748.4, UKIPO, date of search: Aug. 11, 2020, date of report: Aug. 19, 2020.

(Continued)

*Primary Examiner* — Lisa C Lewis
(74) *Attorney, Agent, or Firm* — Bhole IP Law; Marc Lampert; Anil Bhole

(57) ABSTRACT

There is provided a system, method, and computing device for distribution of cryptographic key generation data in a secure network, the secure network comprising a security server and one or more clients. The method including: receiving or generating indexed random data; communicating at least a portion of the indexed random data to one of the clients; and receiving or communicating the indices of the portions of the indexed random data shared with the client, a portion of the indexed random data is used for cryptographic key generation for encrypted communication between the client and another client. In some cases, the (Continued)

above is repeated for each client, wherein the indexed random data is unique for each client.

20 Claims, 3 Drawing Sheets

Related U.S. Application Data

(60) Provisional application No. 63/384,324, filed on Nov. 18, 2022, provisional application No. 63/383,813, filed on Nov. 15, 2022.

(56) References Cited

U.S. PATENT DOCUMENTS

| | | | |
|---|---|---|---|
| 11,177,950 | B2 | 11/2021 | Lo et al. |
| 2004/0030932 | A1 | 2/2004 | Juels et al. |
| 2006/0205388 | A1 | 9/2006 | Semple et al. |
| 2008/0307110 | A1 | 12/2008 | Wainner et al. |
| 2009/0067629 | A1* | 3/2009 | Kraszewski ........ H04L 63/0428 380/44 |
| 2010/0211787 | A1 | 8/2010 | Bukshpun et al. |
| 2010/0246811 | A1 | 9/2010 | Sadler |
| 2012/0204032 | A1 | 8/2012 | Wilkins et al. |
| 2013/0159731 | A1 | 6/2013 | Furukawa |
| 2013/0262858 | A1 | 10/2013 | Neuman et al. |
| 2014/0369498 | A1 | 12/2014 | Hammersmith |
| 2015/0134947 | A1 | 5/2015 | Varcoe et al. |
| 2015/0142836 | A1 | 5/2015 | Borges et al. |
| 2015/0220751 | A1 | 8/2015 | Syben |
| 2015/0295907 | A1 | 10/2015 | Abrahamson |
| 2017/0180117 | A1 | 6/2017 | Tomkow |
| 2017/0250796 | A1 | 8/2017 | Samid |
| 2017/0338951 | A1 | 11/2017 | Fu et al. |
| 2018/0109372 | A1 | 4/2018 | Fu |
| 2018/0150647 | A1 | 5/2018 | Naqvi et al. |
| 2018/0219677 | A1 | 8/2018 | Nair et al. |
| 2018/0367298 | A1 | 12/2018 | Wright et al. |
| 2019/0044923 | A1 | 2/2019 | Thompson et al. |
| 2019/0089687 | A1 | 3/2019 | Fiske |
| 2020/0320227 | A1 | 10/2020 | Sadjadpour |
| 2020/0328886 | A1 | 10/2020 | Newton et al. |
| 2021/0099296 | A1 | 4/2021 | Lo et al. |
| 2021/0232702 | A1 | 7/2021 | Gelbard |
| 2022/0021521 | A1* | 1/2022 | Shamai .............. G06Q 20/3676 |

FOREIGN PATENT DOCUMENTS

| | | |
|---|---|---|
| JP | 2012147341 A | 8/2012 |
| WO | 2019069103 A1 | 4/2019 |
| WO | 2019076737 A1 | 4/2019 |

OTHER PUBLICATIONS

Examination Report for UK application No. GB2102574.7, UKIPO, dated: Jun. 22, 2021.
Extended European Search Report for EU application No. 20872410.4, EPO, dated: Oct. 19, 2023.
International Search Report for PCT application No. PCT/CA2020/051307, CIPO, search completed: Nov. 17, 2020, mailed: Nov. 25, 2020.
International Search Report for PCT application No. PCT/CA2023/051400, CIPO, search completed: Dec. 21, 2023, mailed: Jan. 5, 2024.
Notice of Allowability for U.S. Appl. No. 18/491,415, USPTO, dated: Feb. 22, 2024.
Notice of Allowance for Canadian application No. 3,107,237, CIPO, dated: Apr. 8, 2021.
Notice of Allowance for U.S. Appl. No. 17/038,819, USPTO, dated: Aug. 23, 2021.
Notice of Allowance for U.S. Appl. No. 18/491,415, USPTO, dated: Jan. 17, 2024.
Office Action for Israeli application No. 291804, Israel Patent Office, dated: Jun. 23, 2024.
Office Action for Japanese application No. 2022-519684, Japan Patent Office, dated: May 21, 2024.
Office Action for Japanese application No. 2022-519684, Japan Patent Office, drafted: Dec. 8, 2023, mailed: Dec. 12, 2023.
Office Action for U.S. Appl. No. 17/038,819, USPTO, dated: Dec. 23, 2020.
Office Action for U.S. Appl. No. 17/038,819, USPTO, dated: Apr. 7, 2021.
Office Action for U.S. Appl. No. 17/500,199, USPTO, dated: Feb. 9, 2024.
Written Opinion of the International Searching Authority for PCT application No. PCT/CA2020/051307, CIPO, opinion completed: Nov. 23, 2020, mailed: Nov. 25, 2020.
Written Opinion of the International Searching Authority for PCT application No. PCT/CA2023/051400, CIPO, opinion completed: Jan. 4, 2024, mailed: Jan. 5, 2024.
"BCC Research Quantum Patent Review", BCC Research LLC, IFT179A, Chap 7, pp. 176-192, 2019., 2019, 177-192.
Cavaiani, Charles , et al., "Mutual authenticating protocol with key distribution in client/server environment", XRDS: Crossroads, The ACM Magazine for Students, vol. 2, Issue 4Mar. 1996, pp. 17-22 (Year: 1996).
Chan, Haowen , et al., "Random key predistribution schemes for sensor networks", 2003 Symposium on Security and Privacy, 2003., Berkeley, CA, USA, 2003, pp. 197-213, doi: 10.1109/SECPRI.2003.1199337.
Curty, Marcos , et al., "Foiling covert channels and malicious classical post-processing units in quantum key distribution", npj Quantum Information 5, 14 (2019). https://doi.org/10.1038/s41534-019-0131-5 ., 2019.
McWilliams, Andrew , "Quantum Computing: Technologies and Global Markets to 2022", BCC Research LLC, Report Code: IFT149A, Aug. 2018, ISBN: 978-1-62296-813-8, Aug. 2018.
Siegel, David A. , et al., "Dealing with key challenges in international usability and user research", CHI EA '07: CHI '07 Extended Abstracts on Human Factors in Computing Systems. Apr. 2007, pp. 2145-2148 (Year: 2007).
Wei, Min , et al., "A mutual authentication scheme with key agreement for industrial wireless network", ICUIMC '11: Proceedings of the 5th International Conference on Ubiquitous Information Management and Communication. Feb. 2011, Article No. 23, pp. 1-8 (Year: 2011).
Xu, Feihu , et al., "Secure quantum key distribution with realistic devices", Rev. Mod. Phys. 92, 025002 (2020), arXiv:1903.09051v3 [quant-ph] Feb. 19, 2020.

* cited by examiner

SYSTEM AND METHOD FOR DISTRIBUTION OF KEY GENERATION DATA IN A SECURE NETWORK

TECHNICAL FIELD

The following relates to data communication systems and encryption utilized in such systems; and more specifically, to a system and method for distribution of key generation data in a secure network.

BACKGROUND

Symmetric and asymmetric cryptographic schemes employed for digital communication often assume that a hypothetical adversary is computationally constrained. A classic example is the widely used Rivest-Shamir-Adleman (RSA) asymmetric scheme, which assumes that factoring the product of two large prime numbers is computationally infeasible. For an adversary in possession of the factors, the communication between the parties involved would be completely insecure. However, an efficient quantum algorithm (Shor's algorithm) for factoring large integers can be run on a cryptographically relevant quantum computer (CRQC). Shor's algorithm can break the RSA scheme, Diffie-Hellman key exchange, and elliptic curve cryptosystems, and consequently poses a serious threat to Public Key Infrastructure (PKI). Although a CRQC is not yet available, a malicious eavesdropper can readily store data being exchanged today for when new breaches of a protocol are developed, technological advances make existing theoretical exploits practical, or the advent of a CRQC.

SUMMARY

In a particular aspect, there is provided a method for distribution of cryptographic key generation data in a secure network, the secure network comprising a security server and one or more clients, the method comprising: receiving or generating indexed random data; communicating at least a portion of the indexed random data to one of the clients; and receiving or communicating the indices of the portions of the indexed random data shared with the client, a portion of the indexed random data is used for cryptographic key generation for encrypted communication between the client and another client.

In a particular case of the method, the method further comprising deleting the portion of the indexed random data shared with the client after the portion is used for the encrypted communication.

In another case of the method, the indexed random data is used to generate a symmetric cryptographic key for the encrypted communication between the client and the other client.

In yet another case of the method, receiving the indexed random data only occurs where the security server is in an associated security hub, and wherein communicating the portion of the indexed random data to one of the clients only occurs where the clients are served by the associated security hub.

In yet another case of the method, receiving the indexed random data comprises physical delivery of hardware, quantum key distribution, symmetric encryption using a pre-shared key, or asymmetric encryption, and wherein communicating the portion of the indexed random data to one of the clients comprises physical delivery of hardware, quantum key distribution, symmetric encryption using a pre-shared key, or asymmetric encryption.

In yet another case of the method, receiving the indexed random data, communicating the at least a portion of the indexed random data to one of the clients, and communicating the indices of the portions of the indexed random data shared with the client are repeated for each client, wherein the indexed random data is unique for each client.

In yet another case of the method, the method further comprising generating the cryptographic key by combining the portions of the indexed random data, associated with each respective user, having the same index.

In yet another case of the method, the secure network comprises a plurality of security servers, the method further comprising, at each security server: receiving a key share for a secret sharing protocol from the client, the key share encrypted using a first single-use key extracted from the indexed random data associated with the client and the respective security server; decrypting the key share using the first single-use key; encrypting the key share using a second single-use key generated from the indexed random data associated with the other client and the respective security server; and communicating the key share encrypted with the second single-use key to the other client.

In yet another case of the method, the first single-use key and the second single-use key are encrypted using One-Time-Pad encryption.

In yet another case of the method, the key share is part of a Shamir secret sharing scheme or a threshold secret sharing scheme.

In yet another case of the method, the method further comprising encrypting the key share using a third single-use key generated from the indexed random data associated with a further client and the respective security server, and communicating the key share encrypted with the third single-use key to the further client.

In another aspect, there is provided a computing device for distribution of cryptographic key generation data in a secure network, the computing device comprising a security server or a distributor in the secure network, the secure network further comprising one or more client devices, the computing device comprising a processor and a memory, the memory having stored thereon computer instructions which when executed by the processor cause the processor to: receive or generate indexed random data; communicate at least a portion of the indexed random data to one of the clients; and receive or communicate the indices of the portions of the indexed random data shared with the client, a portion of the indexed random data is used for cryptographic key generation for encrypted communication between the client and another client.

In a particular case of the computing device, the instructions further comprise deleting the portion of the indexed random data shared with the client after the portion is used for the encrypted communication.

In another case of the computing device, the indexed random data is used to generate a symmetric cryptographic key for the encrypted communication between the client and the other client.

In yet another case of the computing device, receiving the indexed random data only occurs where the security server is in an associated security hub, and wherein communicating the portion of the indexed random data to one of the clients only occurs where the clients are served by the associated security hub.

In yet another case of the computing device, receiving the indexed random data comprises physical delivery of hardware, quantum key distribution, symmetric encryption using a pre-shared key, or asymmetric encryption, and wherein communicating the portion of the indexed random data to one of the clients comprises physical delivery of hardware, quantum key distribution, symmetric encryption using a pre-shared key, or asymmetric encryption.

In yet another case of the computing device, receiving the indexed random data, communicating the at least a portion of the indexed random data to one of the clients, and communicating the indices of the portions of the indexed random data shared with the client are repeated for each client, wherein the indexed random data is unique for each client.

In yet another case of the computing device, the instructions further comprise generating the cryptographic key by combining the portions of the indexed random data, associated with each respective user, having the same index.

In yet another case of the computing device, the secure network comprises a plurality of security servers, wherein the instructions further comprise, to be performed at each security server: receiving a key share for a secret sharing protocol from the client, the key share encrypted using a first single-use key extracted from the indexed random data associated with the client and the respective security server; decrypting the key share using the first single-use key; encrypting the key share using a second single-use key generated from the indexed random data associated with the other client and the respective security server; and communicating the key share encrypted with the second single-use key to the other client.

In yet another case of the computing device, the first single-use key and the second single-use key are encrypted using One-Time-Pad encryption.

In yet another case of the computing device, the key share is part of a Shamir secret sharing scheme or a threshold secret sharing scheme.

In yet another case of the computing device, the instructions further comprise encrypting the key share using a third single-use key generated from the indexed random data associated with a further client and the respective security server, and communicating the key share encrypted with the third single-use key to the further client.

These and other aspects are contemplated and described herein. The foregoing summary sets out representative aspects of methods and computing devices to assist skilled readers in understanding the following detailed description.

DESCRIPTION OF THE DRAWINGS

A greater understanding of the embodiments will be had with reference to the Figures, in which.

DETAILED DESCRIPTION

Figure 1:
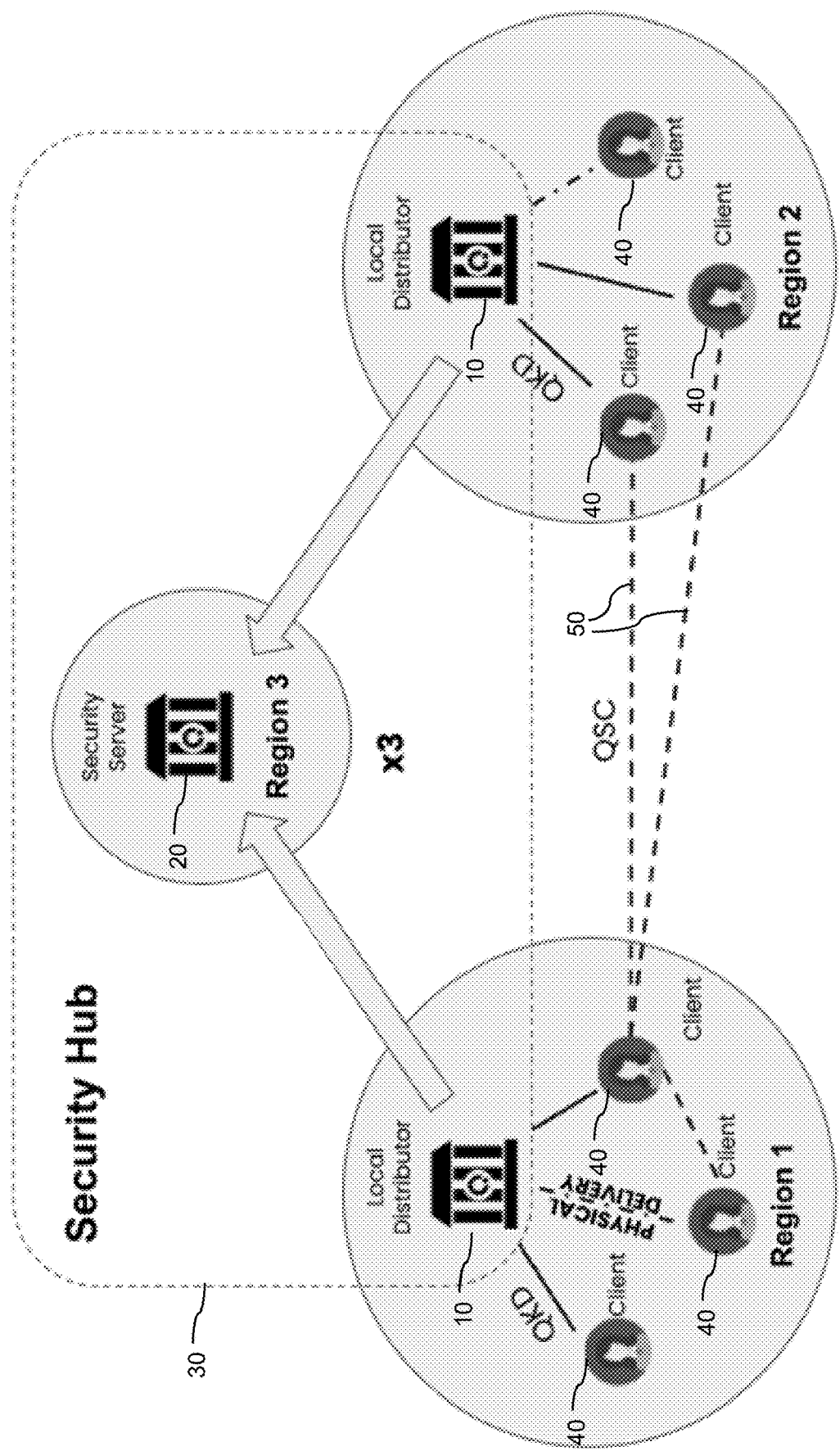
FIG. 1 is a conceptual diagram of an example computing environment for distribution of key generation data in a secure network, according to an embodiment.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, by a single gender, etc. Further definitions for terms may be set out herein; these may apply to prior and subsequent instances of those terms, as will be understood from a reading of the present description.

Any module, unit, component, server, computer, terminal or device exemplified herein that executes instructions may include or otherwise have access to computer readable media such as storage media, computer storage media, or data storage devices (removable or non-removable). Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology. Any such computer storage media may be part of the device or accessible or connectable thereto. Further, unless the context clearly indicates otherwise, any processor or controller set out herein may be implemented as a singular processor or as a plurality of processors. A plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

In the present disclosure, the following terminology will be used:

Client—A computing device capable of receiving and storing pre-shared random data (PSRD) and initiating requests for key generation or shared secrets with other Clients via some number of Security Servers;

PSRD Distributor—Computing device(s) or system that is devoted to secure distribution of PSRD from a Security Hub to the Clients, typically in a specific geographic region;

Post-Quantum Cryptography (PQC)—asymmetric cryptographic algorithms that are designed to be resistant to attacks by quantum computers;

PSRD—Pre-shared random data;

QKD—Quantum Key Distribution;

Quantum Secure Channel (QSC)—Communication channels that are secured by methods that are resistant to attacks by both classical and quantum computers;

Security Hub—A grouping consisting of a Security Server and, in some cases, one or more PSRD Distributors; and Security Server—A server or cluster of servers that manages the core operation of sharing PSRD and facilitating secure communication between Clients in order to exchange symmetric keys or secrets.

Quantum-secure key distribution approaches have a critical difference in comparison to asymmetric solutions and have applications in network security, end-user device security, and embedded systems. Such approaches can be effectively coded to run on computationally constrained devices, where asymmetric encryption may be too demanding.

The present embodiments can also generally be compatible with asymmetric encryption; such that asymmetric encryption via post-quantum cryptography (PQC) could be used for moving PSRD.

Quantum Key Distribution (QKD) is also a quantum-secure key distribution system. It relies on the foundations of quantum mechanics, in contrast to traditional public key cryptography, which relies on the computational intractability of certain mathematical functions. The main drawback of Quantum Key Distribution is a problem often referred to as the rate-distance limitation. Significantly increasing the bit rate or range of QKD is currently considered to be infeasible without quantum repeaters. This generally limits QKD to regional or Metropolitan Area Networks (MAN) or to ground-to-satellite QKD.

Current attempts to overcome the above limitation largely use trusted relay architectures. Trusted relays provide a simple method to overcome distance limitations, without significantly increasing the complexity of the QKD architecture. The primary drawback of trusted relays is their reliance upon a series of intermediate nodes. Importantly, these nodes must be trusted. In a basic implementation, if any one relay in a chain of relays is compromised, the entire system is compromised. The number of trusted relays required for a QKD network increases linearly with the distance between nodes if the required throughput is kept constant.

FIG. 1 shows a diagram of an example computing environment, in accordance with the present embodiments. The computing environment includes PSRD Distributors 10, each associated with one Security Server 20. In FIG. 1, a first PSRD Distributor 10 is located in Region 1 and a second PSRD Distributor 10 is located in Region 2. The subsystem composed of a Security Server 20 and all its PSRD Distributors 10 is referred to as a Security Hub 30. In the example computing environment of FIG. 1, there are three Security Hubs 30 (denoted by the label "×3"). The computing environment can thus provide one or more active Security Hubs 30, where the presence of multiple Security Hubs 30 provides substantial benefits, as described herein. PSRD Distributors 10 share large amounts of unallocated pre-shared random data (PSRD) with their associated Security Hub 30. When the PSRD Distributor 10 allocates and delivers a portion of the PSRD to a Client 40, it notifies the Security Server 20 of the indices of the PSRD delivered to the Client 40. Communication between PSRD Distributors 10 and Clients 40 can be performed using either QKD or physical delivery. In other cases, such communication can include a symmetric encryption algorithm using a pre-shared key (if such pre-shared key exists between the PSRD Distributor 10 and the Client 40) or an asymmetric encryption technique. Any pair of, or group of, Clients 40 can, if they wish, use encryption that provides complete secrecy, of which One Time Pad (OTP) encryption is an example, and secret sharing to achieve key distribution that can be used for encryption and authentication; i.e., for securing the QSC 50.

The goal of the Clients 40 is to generate identical symmetric cryptographic keys in a way that is information-theoretically secure; or computationally secure in cases where standard symmetric or asymmetric cryptography is used for distributing PSRD or protocol messages. Note that any number of Clients 40 are allowed in the system, and each Client 40 can be connected to any of the available PSRD Distributors 10.

The links between the PSRD Distributor 10 and the Clients 40 in FIG. 1 are used to transport pre-shared random data between PSRD Distributors 10 and the Clients 40, as described herein. The links between Clients 40 represent communication channels secured by cryptographic keys provided in accordance with the embodiments described herein.

The communication network can be any suitable communication architecture; for example, the Internet, a wide-area-network (WAN), a local-area-network (LAN), a mobile communication structure, or the like. The communication links may be any suitable communication approach; for example, fixed telephone lines, wireless connections, near field communication connections, or other forms of communication. The computing devices in the environment may be any suitable type of computing device; for example, a desktop computer, a laptop computer, a tablet, a smartphone, a wearable device, an internet-of-things (IoT) device, a server, a distributed computing system, a dedicated piece of hardware, and the like.

The present embodiments provide an approach for distributing cryptographic keys between Clients 40 without the need for the Clients 40 to mutually pre-share or pre-exchange any information. The present embodiments make use of service providers, the Security Hubs 30. Each Security Hub 30 has a hierarchical structure, composed of a single Security Server 20, and in some cases, one or more PSRD Distributors 10. In some cases, the function or location of the PSRD Distributor 10 may be combined with the Security Server 20.

Figure 2:
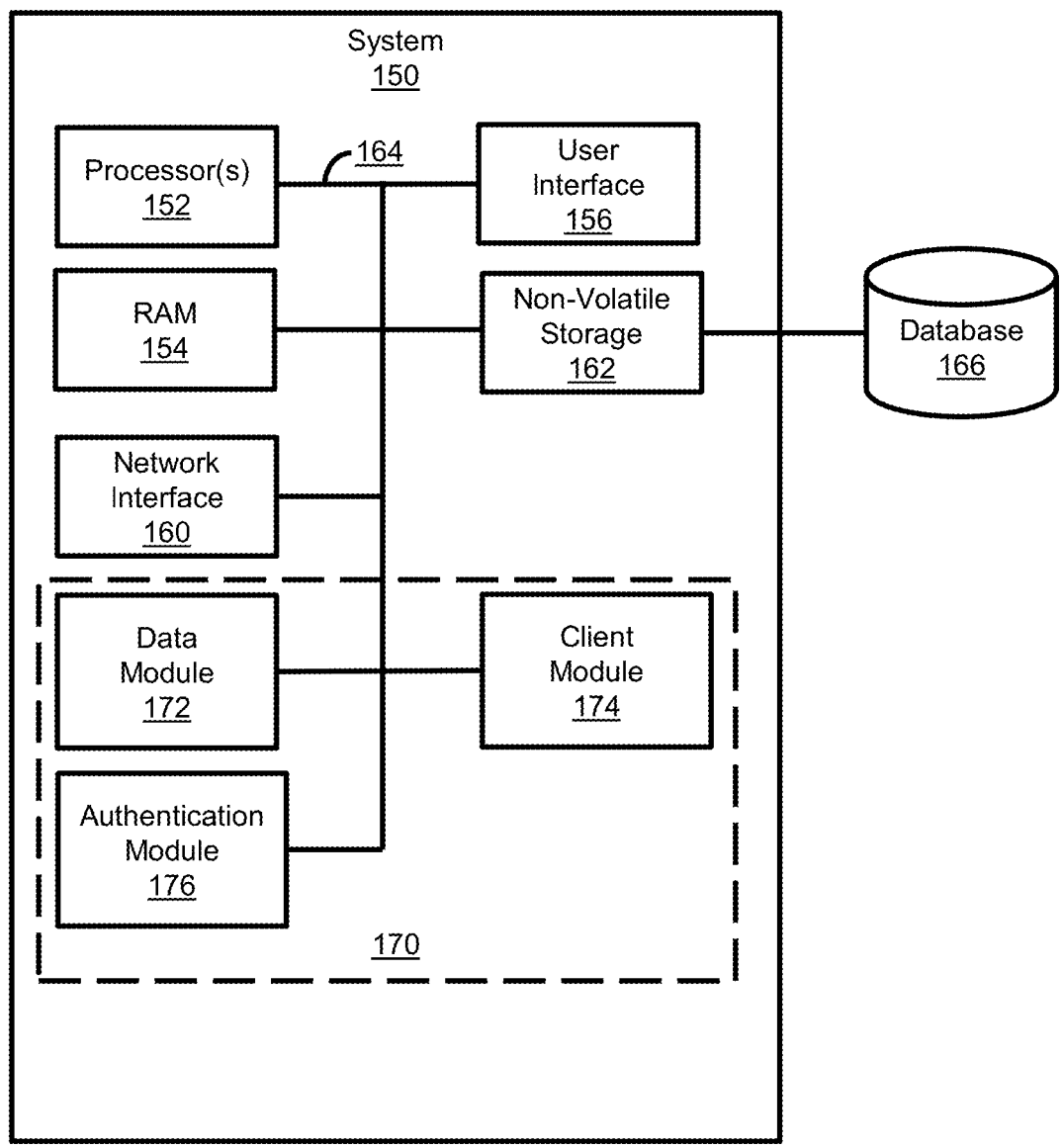
FIG. 2 is a conceptual diagram of a system for distribution of key generation data in a secure network, according to an embodiment.

Turning to FIG. 2, shown is a diagram of a computing device 150 for distribution of key generation data in a secure network, according to an embodiment. The computing device 150 can be run on, or be part of, the PSRD Distributor 10 and/or the Security Server 20, and can comprise a single computing device or multiple devices with associated shared storage. In other cases, the components of the computing device 150 can be distributed among two or more computer systems that may be locally or remotely distributed; for example, using cloud-computing resources.

FIG. 2 shows various physical and logical components of a computing embodiment of the computing device 150. As shown, the computing device 150 has a number of physical and logical components, including a processor 152 (comprising one or more processors), random access memory ("RAM") 154, a user interface 156, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse, touchscreen or keyboard. The user interface 156 also outputs information to output devices; for example, a display. The network interface 160 permits communication with the network 20 or other computing devices and servers remotely located from the computing device 150. Non-volatile storage 162 stores the operating system and programs, including computerexecutable instructions for implementing the operating system and modules, as well as any data used by these services. Additional stored data can be stored in a database 166. During operation of the computing device 150, the operating system, the modules, and the related data may be retrieved from the non-volatile storage 162 and placed in RAM 154 to facilitate execution.

In an embodiment, the computing device 150 further includes a number of conceptual modules 170 to be executed on the one or more processors 152, including a data module 172, a client module 174, and an authentication module 176.

The PSRD Distributors 10 deliver to the Clients 40 unique tables of indexed random data, called pre-shared random data (PSRD). In general, in order to be maximally secure, the generation and management of PSRD should adhere to strict constraints of randomness, secrecy and related security, erasure prior to use if potentially tampered, and secure erasure when copied, transferred or used. The purpose of a PSRD Distributor 10 is to facilitate the sharing of PSRD between a Client 40 and the Security Server 20. In most cases, the PSRD Distributor 10 is geographically located to be more convenient to a set of Clients 40. The delivery of PSRD from PSRD Distributors 10 to Clients 40 can happen in a number of different ways, including physical delivery of tamper-proof or tamper-evident hardware, a sealed tamper-evident QR code, quantum key distribution (QKD) techniques, electronic delivery using a symmetric cipher (such as Advanced Encryption Standard) where the information-theoretical security property is lost, or PQC-protected encryption where security assurances are further reduced. Furthermore, the same PSRD Distributor 10 can deliver PSRD to different Clients 40 in different ways. For example, the PSRD Distributor 10 could deliver PSRD to one Client 40 using QKD, and to another Client 40 via physical delivery of tamper-proof hardware. A Security Hub 30 may use any one or more of its PSRD Distributors 10 to deliver PSRD to a given Client 40. In some cases, for the purposes of delivering the PSRD to a Client 40, the PSRD Distributor 10 may need to be geographically located within the same region due to range limitations, geographic constraints, administrative constraints and/or logistical constraints. The Security Server 20 may be geographically located anywhere in the world.

Particularly, the PSRD are private tables of indexed random data that are generated from a high quality source of randomness; for example, from a quantum random number generator. The PSRD is adequately indexed so that two parties sharing the same PSRD tables can identify the value in the PSRD by referring to only the indices.

The Security Server 20 receives, or otherwise owns, a copy of all PSRD delivered by PSRD Distributors 10 to Clients 40. This exchange of PSRD between the Security Server 20 and a PSRD Distributor 10 can happen prior to or after the PSRD is delivered to the Clients 40 by the PSRD Distributor 10.

If the exchange occurs prior to the PSRD being delivered to the Clients 40, either the Security Server 20 or the PSRD Distributor 10 generates a large amount of unallocated random data, properly indexed, and delivers an exact copy to the other party. Before the PSRD Distributor 10 delivers PSRD to a Client 40, it notifies the Security Server 20 to which portion of the initial unallocated random data has been delivered, or the Security Server 20 notifies the PSRD Distributor 10 of which portion of this unallocated data to deliver, by using the associated indices for such data. If the exchange occurs after the PSRD is delivered to the Clients 40, the PSRD Distributor 10 delivers an exact copy of the PSRD delivered to a specific Client 40 to the Security Server 20. The exchange of data between the Security Server 20 and the PSRD Distributors 10 happens via physical delivery using tamper-proof hardware, via QKD, a combination of the two, or any other sufficiently secure means.

Each Client 40 shares the PSRD with each of one or more Security Servers 20 via either a direct transportation of the PSRD from the Security Server 20 or via the PSRD transportation using any of the PSRD Distributors 10 in the same Security Hub 30 as the Security Server 20. Each Security Server 20 belongs to a separate Security Hub 30 and therefore has its own set of PSRD Distributors 10. When a Client 40 shares PSRD with a Security Server 20, it can be considered as the Client 40 now being served by that Security Hub 30. In an example, consider two Clients 40, referred to as Alice and Bob, who are served by a common set of one or more Security Hubs 30. This arrangement allows Alice and Bob to exchange a symmetric key. The symmetric key can be generated using any suitable approach, for example, using Advanced Encryption Standard (AES) or ChaCha20.

For example, using one or more Security Servers 20, where a plurality of first private tables are each shared with Alice and a respective one of the Security Servers 20 and where a plurality of second private tables each shared with Bob and a respective one of the Security Servers 20. The first private tables comprising values of random data with associated indices, the second private tables comprising other values of random data with associated indices that are distinct from those of the first private tables. The values in the first private tables are not shared with Bob and the values in the second private tables are not shared with Alice. In such example, Bob receives indices each associated with a value in one of the second private tables, each index received from the respective Security Server 20 having the second private table sharing those values. Each index is associated with a value that matches an indexed value in one of the first private tables received by the same respective Security Server 20 from Alice. A common key is generated for the secure communication by combining the indexed values of the second private table and the common key is authenticated using an authentication protocol. In a particular example, the method described herein can be used.

Other than the above example, other techniques for encryption with complete secrecy can be used by any group of Clients 40 and the Security Servers 20 in order to generate symmetric cryptographic keys.

Each PSRD Distributor 10 is the center of a regional network connected to Clients 40 for the delivery of the Pre-Shared Random Data (PSRD). PSRD can be generated via a high-quality entropy source, for example, a Quantum Random Number Generator (QRNG). The PSRD is either generated by the PSRD Distributor 10, or by the Security Server 20. Either way, a copy of the PSRD is delivered to the other party using the approaches described herein. So, in the case where the PSRD is generated by the PSRD Distributor 10, a copy is then transported to the Security Server 20. In the case where the PSRD is generated by the Security Server 20, it is then transported to one of the PSRD Distributors 10, and is generally repeated for each PSRD Distributor 10. In this way, each PSRD Distributor 10 shares a unique copy of PSRD with the Security Server 20.

The PSRD does not need to be allocated to a specific Client 40 at the time that it is generated. Instead, when generated, the PSRD can be unallocated, although allocation to a specific Client 40 at the time of generation is not precluded. Each copy of the unallocated PSRD is stored at both the Security Server 20 and one PSRD Distributor 10 until either of them allocates it and that portion of the PSRD is delivered to a respective one of the Clients 40. PSRD is indexed so that portions of the PSRD may be easily identified and referenced. Techniques for delivery of the PSRD to Clients 40 are described herein.

Additional unallocated PSRD deliveries can be made before the existing unallocated PSRD is exhausted.

The PSRD can be transferred between the Security Server 20 and the PSRD Distributor 10, or vice versa, using, for example, any of the following mechanisms:

QKD;

physical delivery using a secure storage medium, preferably tamper-proof, and in some cases, using secure key transporting devices such as key loaders or key fillers;

electronically, if a pre-shared key already exists between the two parties, however, in many cases, this is not information-theoretically secure even if it does not use any asymmetric encryption;

electronically, using asymmetric cryptographic algorithms including PQC, which are resistant to quantum computer attacks, but are generally not information-theoretically secure and may suffer from other weaknesses, including being vulnerable to quantum computer attacks, among other issues; or any combination of the above.

When a new Client 40 joins the system, the PSRD Distributor 10 or the Security Server 20 can provide a copy of (or a copy of a portion of) the PSRD to the Client 40. The method of transport of the PSRD to the Client 40 can be (but is not limited to) any of the following mechanisms:

QKD;

physical delivery using a secure storage medium, preferably tamper-proof, and in some cases, using secure key transporting devices such as key loaders or key fillers;

electronically, if a pre-shared key already exists between the two parties, however, in many cases, this is not information-theoretically secure even if it does not use any asymmetric encryption;

electronically, using asymmetric cryptographic algorithms including PQC, which are resistant to quantum computer attacks, but are generally not information-theoretically secure and may suffer from other weaknesses, including being to be vulnerable to quantum computer attacks, among other issues;

tamper-evident sealed QR codes or similar visibly encoded means; or any combination of the above.

Whenever data is transmitted to the Client 40 by the PSRD Distributor 10, the Security Server 20 is notified of the PSRD indices sent to the Client 40, and the data may be deleted, or otherwise marked as being used, from the PSRD Distributor 10 data store. In the case where the Security Server 20 delivers the PSRD (or a portion of the PSRD) to the Client 40, the Security Server 20 notifies the PSRD Distributors 10 of the PSRD indices sent to the Client 40, and the data may be deleted or marked from the PSRD Distributor's 10 data store. In most cases, the data is deleted to ensure that the only copies exist at the Client 40 and at the Security Server 20, who will use this data; consistent with the principles of single-use keys. Multiple copies of the same PSRD stored unnecessarily in more than these two locations can increase risk of compromise without any benefit to the system. Note that the communication between the PSRD Distributor 10 and the Security Server 20 can happen over an unsecured channel, albeit using a secure protocol. In any case, the only information to be transmitted is with respect to the indices of the PSRD that have been allocated to a Client 40. This communication should be authenticated, but can also be encrypted using a portion of the PSRD shared between the PSRD Distributor 10 and the Security Server 20.

A Client 40 can perform the same operations with each of a number of Security Hubs 30. The Client 40 shares random data (the PSRD) with the Security Servers 20 in one or more Security Hubs 30, and key generation can use such data.

Key generation can be performed using an suitable approach, for example, as follows. Name the PSRD tables shared between a first Client, referred to as Alice, and Security Server 1, Security Server 2, . . . , Security Server N, respectively $H^A_1$, $H^A_2$, . . . , $H^A_N$. Name the PSRD tables shared between a second Client, referred to as Bob, and Security Server 1, Security Server 2, . . . , Security Server N, respectively $H^B_1$, $H^B_2$, . . . , $H^B_N$. Alice and Bob wish to achieve the sharing of a common key $K^{AB}$ between them, and in some cases, without any single Security Server having access to the value of $K^{AB}$. In an embodiment, the key generation phase can include five parts: "Peer Identity Establishment", "Share Generation", "Share Distribution", "Key Reconstruction", and "Key Validation"; which can altogether be referred to as a "General Distributed Symmetric Key Exchange Protocol" or "General Protocol".

During the first part, referred to as "Peer Identity Establishment", Alice and Bob establish the authenticity of each other's identities. Authentication of identities between Alice and Bob and the Security Servers is generally a result of the PSRD generation and distribution phase. Any DSKE Client can use a protocol to query the identities of other clients from each Security Server, where the Security Server authenticates and the DSKE Client validates the identity claim by the Security Server using an information-theoretically secure message tag. A Security Server that provides identity information about a DSKE Client that conflicts with a consensus is excluded from the protocol by the querying DSKE Client. In this way, the initial authentication between DSKE Clients and Security Hubs can be propagated in the system to authenticate DSKE Clients with each other, and each DSKE Client gets to know the identifier used by each Security Server for another DSKE Client.

During the second part, referred to as "Share Generation", Alice uses a pre-agreed family of (N, k) secret sharing schemes to generate N shares $S_1, S_2, \ldots, S_N$ of the final key S. Share $S_1$ is associated with Security Server 1, share $S_2$ is associated with Security Server 2, and so on. k is the minimum number of these shares from which it is possible to reconstruct the key S, which is to be shared between Alice and Bob. To generate the key shares that will be used to distribute the key to Bob, Alice first decides the length of the key to be generated, i.e. the number of bits m in the key that she wants to share with Bob. Then, for each $i \in \{1, 2, \ldots, N\}$, Alice selects from $H^A_i$ an unused sequence $R^A_i$ of m+I bits, which may simply be the first unused sequence in $H^A_i$. The integer I is the length in bits of the parameter h for the family of universal hash functions that is used in this protocol for generating a key tag. Therefore, Alice arrives at N strings of bits like the following: $R^A_i = [H^A_{i,j}, H^A_{i,j+1}, H^A_{i,j+2}, \ldots, H^A_{i,j+m+I-1}]$, where j is the index into the table $H^A_i$, optionally of the first bit that has never been used before in the DSKE protocol. Generally, due to the ability of compromised Security Hubs to modify the shares Si of the secret in transit, including the portion of the shares for the I bits that are the secret parameter h, the family of universal hash functions that is used for generating a key tag is chosen with the property that the security against forging the key tag remains strong in the specific context of the chosen secret sharing scheme.

Starting from the N strings $R^A_i$, Alice builds N shares, named $Y_i$ for $i \in \{1, 2, \ldots, N\}$, to send to the Security Servers. She arbitrarily selects k Security Servers for which she sets $Y_i = R^A_i$ and uses this as a share for Security Server i. In the case k=N, all the shares have been generated. In the case where k<N, she uses these k shares and then uses the secret sharing scheme to construct the remaining N−k shares, such that the secret can be reconstructed from any k of these shares. At this point, Alice will have one share $Y_i$ for each $i \in \{1, 2, \ldots, N\}$.

During the third part, referred to as "Share Distribution", for each $i \in \{1, 2, \ldots, N\}$, Alice encodes N, k, the ordered indices of the sequence of bits $R^A_i$ from $H^A_i$ (which, for example, may simply be a start index and a length), along with Bob's identity, a unique key identifier (which, for example, may include an index into a running key), and the key tag if generated. Alice may also encode auxiliary information, such as the coordinate $X_i$ for Shamir's secret sharing scheme. Alice encrypts the N−k shares $Y_i$ that were not generated from $R^A_i$ by using $R^A_i$ as a one-time pad to produce the encrypted share $Z^A_i$ (e.g., $Z^A_i = Y_i \oplus R^A_i$), which she includes in the message. She adds a message tag, the generation of which may consume further bits of $H^A_i$ that are not included in $R^A_i$, and transmits the aggregate to Security Server i. Each Security Server i interprets the message that it receives from Alice, checking indices for overlap, validates the message tag, and decrypts each share, marking as 'used' the indices into $H^A_i$. The Security Server i marks all the bits of $H^A_i$ that were consumed in the process as 'used'.

If the validation of the message from Alice is successful, each Security Server then determines its share $Y_i$ (in the example, $Y_i = R^A_i$ or $Y_i = Z^A_i \oplus R^A_i$ as determined by the message from Alice). Security Server i selects an unused sequence $R^B_i$ of m+I bits from $H^B_i$, and uses $R^B_i$ as a one-time key to encrypt the share $Y_i$ to produce $Z^B_i$ (e.g., $Z^B_i = Y_i \oplus R^B_i$). Security Server i then builds a key instruction message for Bob as Alice did for Security Server i, including an encoding of the sequence of indices of the sequence of bits used from $H^B_i$, Alice's identifier, the key identifier, the encrypted share $Z^B_i$, the key tag that Alice may have included and a message tag. Security Server i then sends this message to Bob.

For each key instruction message received by Bob from the Security Server i, Bob checks that the Security Server i is members of an acceptable set (e.g., a pre-agreed set of N Security Hubs, or else Security Hubs known to serve both Alice and Bob). Bob performs the same sequence of actions as performed by the Security Server i; namely checking that Alice is an accepted identifier and that N and k (as encoded in the message) are each in an acceptable range. Further, Bob checks indices for overlap, validates the message tag, and decrypts each share, marking as used the indices into $H^B_i$. Messages that fail in any respect are discarded. At the end of this phase, Bob has successfully received a number of shares, s.

During the fourth part, referred to as "Key reconstruction", Bob has enough information to either reconstruct a set of candidates for the secret S, or abort the protocol. If the number of shares s that Bob has received is less than k, Bob aborts the protocol. Otherwise, he reconstructs a candidate secret from each subset of k shares with consistent protocol parameters (including the key tag, if present) using the associated (N, k) secret sharing scheme.

During the fifth part, referred to as "Key Validation", Bob picks a candidate for S that represents the final key shared with Alice or, alternatively, aborts the protocol. To begin, Bob matches all reconstructed candidate secrets against the key tag applicable to the subset of k shares that it was derived from, eliminating those candidate secrets that mismatch. If the number of compromised Security Hubs is below k, no candidate secret will be known to an adversary, who will consequently be unable to produce a tag that Bob will accept, and only one candidate key will remain, albeit potentially from multiple combinations of shares. If more than one distinct candidate remains, Bob aborts the protocol. If Bob is left with one candidate, this must be S, and Alice and Bob correctly conclude the protocol with a shared key, as intended.

Once the random data is shared between the Clients 40 and the Security Servers 20, the information-theoretically secure distribution of symmetric keys can be performed by means of, for example, encryption with complete secrecy and secret sharing; an example of which are the five parts "Peer Identity Establishment", "Share Generation", "Share Distribution", "Key Reconstruction", and "Key Validation", which are described herein. One-Time Pad encryption for the transfer of secret data from one Security Server to a Client, or vice versa, is an example of encryption with complete secrecy. Use of a threshold secret sharing scheme (for example, the Shamir secret sharing scheme) can be used to prevent any Security Server 20 from having any information about secrets agreed between Clients 40. In an example, for any two or more Clients 40 sharing PSRD with a common set of Security Servers 20, the Clients 40 are in a position to use approaches for secure communication, such as those described herein, over classical communication channels (for example, over the Internet). In the example of FIG. 1, any Client 40 in Region 1 can now use the present embodiments to share a key in an information-theoretically secure manner with any Client 40 in Region 2. For example, using the General Protocol described herein; in which the PSRD, shared between a Client 40 (user device in the incorporated reference) and a Security Server 20 via the Security Hub (privacy provider in the incorporated reference), is used in said protocols. The various regions can be very far apart geographically. In this way, the Security Hub 30 of the present embodiments advantageously allows for geographical expansion in an effective manner while maintaining required security properties.

In an example application of the present embodiments, the General Protocol, described herein, can be generalized to allow any form of encryption and authentication to be used for the communicated messages and key instructions. These messages can include sharing of the secret transmitted to the Security Server 20 by the first Client 40, and for the corresponding message that the Security Server 20 communicates to the second Client 40. For example, such messages may be encrypted and authenticated using a standard mode of a symmetric block cipher that uses PSRD associated with the first Client 40, or associated with the second Client 40, respectively, as a key. This example can also include situations where several encryption and authentication schemes are used in tandem, for example, to achieve multiple encryptions.

In another example, for any two or more Clients 40 sharing the PSRD with a common set of Security Servers 20, one of the Clients 40, e.g., Alice, can send a key share built with a secret sharing protocol (for example, Shamir secret sharing scheme) to another Client 40, e.g., Bob. The PSRD can be shared via the Security Server 20, using, for example, One-Time-Pad encryption with a single-use key extracted from the PSRD shared with the Security Server 20. Each Security Server 20 decrypts the key share using the same key that Alice used, similarly derived from the indexed PSRD. Each Security Server 20 then encrypts the key share with a key extracted by the PSRD shared with Bob, using, for example, One-Time-Pad encryption and information-theoretically secure authentication, and sends the encrypted and authenticated message to Bob. Bob can then, in turn, decrypt it in a like fashion. Bob therefore would expect to receive and decrypt a number of key shares equal to the number of Security Servers 20 selected by Alice. Bob can thus rebuild a secret key by properly combining the key shares using the same secret sharing scheme used by Alice; in an example, the Shamir secret sharing scheme.

In another example application of the present embodiments, the General Protocol, described herein, can be generalized to allow alternative secret sharing schemes. For example, the Shamir secret sharing scheme may be replaced by another threshold secret sharing scheme, including a scheme that gives different weights to the shares known to individual Security Hubs 30.

In this example, a first Client 40, e.g., Alice, can request that each Security Server 20 send the share simultaneously to more than one other designated Client 40, e.g., Bob and Carol. In this case, the Security Server 20 can send the share to each of the designated Clients 40. In this manner, Alice may simultaneously exchange a secret with multiple other Clients 40.

Further, in this example, a first Client 40, can request that each Security Server 20 send the share, where one of the other designated Clients 40 can be the first Client 40. In this way, with optional storage and later retrieval of the resulting encrypted share, secure management of secret data is facilitated; for example, to manage a securely encrypted data backup.

In general, for any two or more Clients 40 sharing PSRD with a common set of Security Servers 20, the Clients can use methods, for example those described in the General Protocol described herein, to generate a symmetric key in a way that is information-theoretically secure. As described in the General Protocol, the requirements are that a group of Clients share private tables of random data with a number of Privacy Providers, which in the present embodiments, comprise the Security Servers 20 (and in a broader sense, the Security Hubs 30) once the private tables have been distributed.

The structure of the Security Hub 30, comprising the Security Server 20, and PSRD Distributors 10, provides an important advantage for the scalability of the key distribution system; and for the integration of techniques such as Quantum Key Distribution. Indeed, in the case where a Security Hub 30 comprises one Security Server 20 and no PSRD Distributor 10, the Security Server would be in charge of the delivery of the PSRD to the Clients, making use of Quantum Key Distribution possible on a local scale. Furthermore, the Security Server 20 may need to physically deliver PSRD to very distant locations, which increases the risk or the cost for transportation of the PSRD. Thus, the Security Server 20 generally strongly benefits from the establishment of PSRD Distributors 10, which take the role of delivering PSRD to local Clients with one of the techniques described herein. Furthermore, to save cost and increase security, the PSRD Distributor 10 benefits from the possibility of generating a large amount of PSRD in advance, before any Clients 40 submit requests, and distributing an identical copy of this large amount of PSRD to the Security Server 20. This avoids the issue of shipping PSRD from the PSRD Distributor 10 to the Security Server 20 on a Client-by-Client basis, but instead aggregates a large amount of PSRD into a single shipment; which then can be used to communicate in a information theoretically secure way the indices of PSRD allocated to Clients 40.

Figure 3:
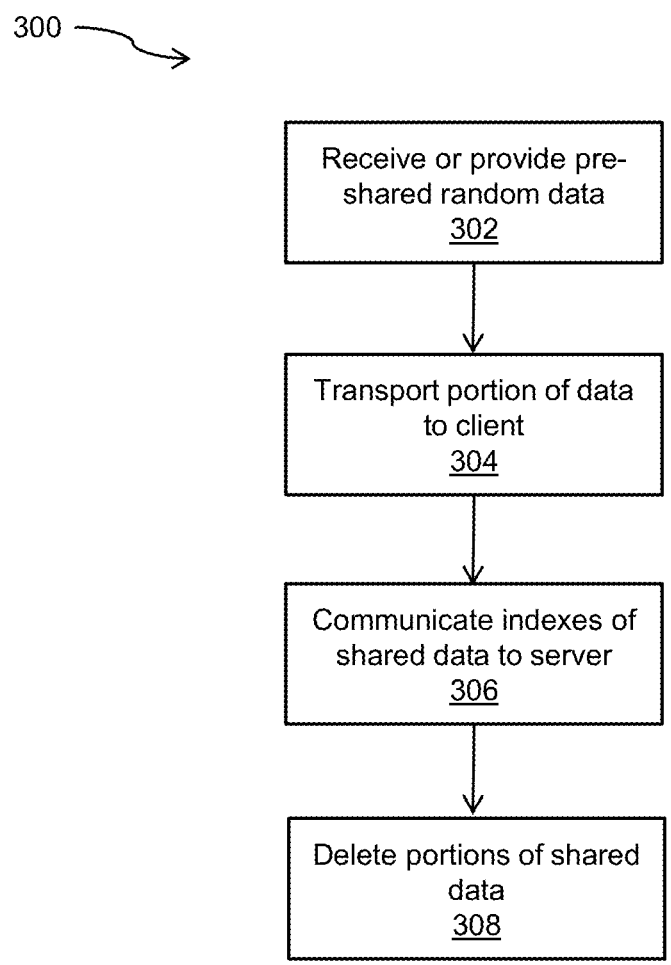
FIG. 3 is a flow chart for a method for distribution of key generation data in a secure network, according to an embodiment.

Turning to FIG. 3, a method for distribution of key generation data in a secure network 300, in accordance with an embodiment, is shown. At block 302, the data module 172, as part of one of the PSRD Distributors 10, receives pre-shared random data (PSRD) from a Security Server 20, or provides PSRD to the Security Server 20. The PSRD comprises indexed random data. At block 304, the client module 174 transports at least a portion of the pre-shared random data to a Client 40. At block 306, the server module 176 communicates the indices of the portions of the pre-shared random data that were shared with the Client 40. At block 308, the data module 172 deletes the portions of the pre-shared random data that were shared with the Client 40.

In some cases of the present embodiments, advantageously, applications may be implemented such that the secret data exchanged between Clients 40 may be used by these Clients 40 as symmetric keys for cryptographically securing communication between parties. A practical example of such applications includes secure communication applications on smartphones together with distribution of PSRD encoded as QR codes in sealed tamper-evident packages and replenished online in encrypted form. A further practical example of such applications includes point-to-point link encryptors in a secure network. A further practical example of such applications includes secure storage of data in a data backup scheme or secure storage of data held in a shared escrow scheme. A further practical example of such applications includes IoT devices which initially contain PSRD, and which are subsequently replenished online in encrypted form. These represent mere examples, and the present embodiments can be applied to a wide range of potential applications in the cryptography space. Particularly, the present embodiments can simplify logistics of key management, with significant advantages for scalability, while adding resistance to quantum computing attacks; which has marked advantages over other approaches such as, for example, PKI.

Although the foregoing has been described with reference to certain specific embodiments, various modifications thereto will be apparent to those skilled in the art without departing from the spirit and scope of the invention as outlined in the appended claims.

The invention claimed is:

1. A method for distribution of cryptographic key generation data in a secure network, the secure network comprising one or more distributors, a security server, and clients, the method comprising:
  receiving or generating indexed random data by a particular distributor of the one or more distributors, the indexed random data shared with the security server;
  communicating to the security server or receiving from the security server, by the particular distributor, indexes of at least a portion of the indexed random data, the portion of the indexed random data to be used for cryptographic key generation; and
  communicating, by the particular distributor or the security server, the portion of the indexed random data to one of the clients, the client in receipt of the portion of the indexed random data generates a cryptographic key using the portion of the indexed random data and uses the cryptographic key for encrypted communication with another client.

2. The method of claim 1, wherein each distributor in the one or more distributors communicates with a respective set of the clients.

3. The method of claim 2, wherein each distributor in the one or more distributors has a unique set of indexed random data shared with the security server.

4. The method of claim 1, further comprising deleting, by the particular distributor, the portion of the indexed random data shared with the client after the portion is used for the encrypted communication.

5. The method of claim 1, further comprising marking as used, by the particular distributor, the portion of the indexed random data shared with the client after the portion is used for the encrypted communication.

6. The method of claim 1, wherein the particular distributor only shares the indexed random data with the security server where the security server is in an associated security hub.

7. The method of claim 1, wherein receiving the indexed random data by the particular distributor from the security server comprises physical delivery of hardware, quantum key distribution, symmetric encryption using a pre-shared key, or asymmetric encryption, and wherein communicating the portion of the indexed random data by the particular distributor to one of the clients comprises physical delivery of hardware, quantum key distribution, symmetric encryption using a pre-shared key, or asymmetric encryption.

8. The method of claim 1, wherein the indexed random data communicated by the particular distributor to each client is unique for each respective client.

9. The method of claim 1, wherein communication, by the particular distributor, of the indexes of to the security server occurs over an unsecured channel using a secure protocol.

10. The method of claim 1, wherein for a new client, the particular distributor communicates a portion of the indexed random data with the new client.

11. A computing device for distribution of cryptographic key generation data in a secure network, the computing device operating as a distributor in the secure network, the secure network further comprising a security server and client computing devices, the computing device comprising a processor and a memory, the memory having stored thereon computer instructions which when executed by the processor cause the processor to:
receive or generate indexed random data, the indexed random data shared with the security server;
communicating indexes of at least a portion of the indexed random data from or to the security server, the portion of the indexed random data to be used for cryptographic key generation; and
communicating the portion of the indexed random data to one of the clients, the client in receipt of the portion of the indexed random data generates a cryptographic key using the portion of the indexed random data and uses the cryptographic key for encrypted communication with another client.

12. The system of claim 11, wherein the computing device, operating as the distributor, communicates with a respective set of the clients that are distinct from sets of clients communicated to by other distributors.

13. The system of claim 12, wherein the computing device, operating as the distributor, has a set of indexed random data shared with the security server that is unique from sets of indexed random data shared with the security server by other distributors.

14. The system of claim 11, wherein the portion of the indexed random data shared with the client is deleted after the portion is used for the encrypted communication.

15. The system of claim 11, wherein the portion of the indexed random data shared with the client is marked as used after the portion is used for the encrypted communication.

16. The system of claim 11, wherein the indexed random data is only shared with the security server where the security server is in an associated security hub.

17. The system of claim 11, wherein receiving the indexed random data from the security server comprises physical delivery of hardware, quantum key distribution, symmetric encryption using a pre-shared key, or asymmetric encryption, and wherein communicating the portion of the indexed random data to one of the clients comprises physical delivery of hardware, quantum key distribution, symmetric encryption using a pre-shared key, or asymmetric encryption.

18. The system of claim 11, wherein the indexed random data communicated to each client is unique for each respective client.

19. The system of claim 11, wherein communication of the indexes of to the security server occurs over an unsecured channel using a secure protocol.

20. The system of claim 11, wherein for a new client, the computing device, operating as the distributor, communicates a portion of the indexed random data with the new client.

* * * * *